United States Patent
Dinc et al.

[11] Patent Number: 6,139,019
[45] Date of Patent: Oct. 31, 2000

[54] SEAL ASSEMBLY AND ROTARY MACHINE CONTAINING SUCH SEAL

[75] Inventors: Osman Saim Dinc, Troy; Norman Arnold Turnquist, Carlisle; George Ernest Reluzco, Schenectady; Lawrence Donald Willey, Burnt Hills; Christopher Edward Wolfe, Niskayuna, all of N.Y.

[73] Assignee: General Electric Company, Schenectady, N.Y.

[21] Appl. No.: 09/327,583

[22] Filed: Jun. 8, 1999

Related U.S. Application Data

[60] Provisional application No. 60/125,892, Mar. 24, 1999.

[51] Int. Cl.[7] .............................. F16J 15/447; F01D 11/02
[52] U.S. Cl. .......................... 277/355; 277/347; 277/420; 415/173.5; 415/174.5
[58] Field of Search ...................................... 277/355, 418, 277/419, 420, 350, 348, 347, 422, 412; 415/174.5, 173.5

[56] References Cited

U.S. PATENT DOCUMENTS

| | | | |
|---|---|---|---|
| 4,420,161 | 12/1983 | Miller | 277/419 X |
| 5,344,160 | 9/1994 | Scarlata et al. | 277/347 |
| 5,630,590 | 5/1997 | Bouchard et al. | 277/53 |
| 5,704,760 | 1/1998 | Bouchard et al. | 277/355 X |
| 5,749,584 | 5/1998 | Skinner et al. | 277/53 |
| 5,890,873 | 4/1999 | Willey | 415/173.5 |
| 5,961,279 | 10/1999 | Ingistov | 277/412 X |
| 5,971,400 | 10/1999 | Turnquist et al. | 277/422 X |
| 6,027,121 | 2/2000 | Cromer et al. | 277/347 |
| 6,030,175 | 2/2000 | Bagepalli et al. | 277/355 X |
| 6,036,437 | 3/2000 | Wolfe et al. | 415/173.5 X |
| 6,045,134 | 4/2000 | Turnquist et al. | 277/355 X |

FOREIGN PATENT DOCUMENTS 2301635  12/1996  United Kingdom.

OTHER PUBLICATIONS

U.S. application No. 09/159,196, filed Sep. 23, 1998, Bagepalli et al., "Hybrid Seal and Rotary Machine Containing Such Hybrid Seal".

U.S. application No. 09/131,486, filed Aug. 10, 1998, Turnquist et al., "Seal Assembly and Rotary Machine Containing Such Seal Assembly".

U.S. application No. 09/131,485, filed Aug. 10, 1998, Turnquist et al., "Brush Seal Segment".

Wolfe et al., "Brush Seals in Industrial Gas Turbines", 33rd AIAA/ASME/SAE/ASEE Joint Propusion Conference & Exhibit, Jul. 6–9, 1997, Seattle, WA.

*Primary Examiner*—Lynne H. Browne
*Assistant Examiner*—Robert G. Santos
*Attorney, Agent, or Firm*—Marvin Snyder; Douglas E. Stoner

[57] ABSTRACT

A seal assembly and a rotary machine, such as a steam turbine, containing such seal. A stator circumferentially surrounds a row of rotor blades. The stator includes an upstream tooth-seal region, a downstream brush-seal region, and an intervening fluid expansion chamber all radially near the blade tips. Debris in the fluid stream is broken down into smaller particles by the tooth-seal region, and the smaller particles are slowed down by the fluid expansion chamber such that minimal damage is caused to the downstream bristles in the brush seal region.

16 Claims, 5 Drawing Sheets

SEAL ASSEMBLY AND ROTARY MACHINE
CONTAINING SUCH SEAL

This application claims priority of a Provisional Application entitled "Combination Brush/Vernier Seal for Steam Turbine Buckets Tips" by Osman S. Dinc et al., U.S. Ser. No. 60/125,892 filed Mar. 24, 1999.

BACKGROUND OF THE INVENTION

The present invention relates generally to seals and to rotary machines, and more particularly to a seal assembly having both seal teeth and brush seal bristles and to a rotary machine containing such seal.

Rotary machines include, without limitation, turbines for steam turbines and compressors and turbines for gas turbines. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas-path leakage in the turbine or compressor area of a gas turbine, between the rotor shaft, or the rotor blade (i.e., bucket) tips, of the turbine or compressor and the circumferentially surrounding turbine or compressor casing, will lower the efficiency of the gas turbine leading to increased fuel costs. Also, steam-path leakage in the turbine area of a steam turbine, between the rotor shaft, or the rotor bucket (i.e., blade) tips, of the turbine and the circumferentially surrounding casing, will lower the efficiency of the steam turbine leading to increased fuel costs.

Steam and gas turbines have positioned a labyrinth tooth seal between the rotating rotor shaft, or the rotating bucket or blade tips, and the circumferentially surrounding stator casing to minimize fluid-path leakage. Steam and gas turbines also have positioned brush seal bristles between the rotating shaft and the circumferentially surrounding stator casing to minimize fluid-path leakage. It is known in steam and gas turbines to replace a longitudinally middle tooth of a labyrinth seal with a primary brush seal thereby creating a hybrid seal, wherein the teeth serve as a secondary seal to the better-sealing brush seal and wherein such hybrid seal is positioned between the rotating rotor shaft and the circumferentially surrounding stator casing. However, no such brush or hybrid seals are used in steam or gas turbines between the rotating bucket or blade tips and the circumferentially surrounding stator casing. It is known that the steam flow in steam turbines contains hard-water solid particles which are propelled by centrifugal force to the radially outer region of the steam path in the vicinity of the bucket tips where such fast moving particles would damage brush-seal bristles even more than they damage seal teeth. It also is known that the gas flow in aircraft gas turbines may contain foreign objects, such as runway debris, which are propelled by centrifugal force to the radially outer region of the gas path in the vicinity of the blade tips where such fast moving particles would damage brush-seal bristles even more than they damage seal teeth. What is needed is a better-sealing seal for steam and gas turbines between the rotating bucket or blade tips and the circumferentially surrounding stator casing.

BRIEF SUMMARY OF THE INVENTION

In a first expression of the invention, a seal assembly includes an arcuate member. The arcuate member has a longitudinal axis and a radially inward side facing the longitudinal axis. The radial inward side includes a longitudinal upstream portion and a longitudinal downstream portion. The longitudinal upstream portion includes a plurality of longitudinally spaced-apart, circumferentially extending, and radially-inward-protruding seal teeth. The longitudinal downstream portion includes a circumferentially extending brush seal having bristles. The brush seal is longitudinally spaced apart from the seal teeth, and the bristles protrude radially inward when viewed in a cross section of the arcuate member taken by a cutting plane wherein the longitudinal axis lies in the cutting plane. The radially inward side has a radius which varies longitudinally such that the radius is larger, longitudinally between the brush seal and a longitudinally-closest one of the seal teeth to the brush seal, than longitudinally between the seal teeth of a longitudinally-closest pair of seal teeth to the brush seal.

In a second expression of the invention, a rotary machine includes a rotor, a row of blades, and a stator. The rotor has a longitudinal axis. The blades (i.e., buckets) each have a longitudinally upstream side, a longitudinally downstream side, a root attached to the rotor, and a radially-outward-extending tip. The stator is generally coaxially aligned with the longitudinal axis and circumferentially surrounds the row of blades. The stator includes a tooth-seal region, a brush-seal region, and a steam-flow expansion chamber. The tooth-seal region is radially positioned near the tips of the blades, is longitudinally positioned toward the longitudinally upstream side of the blades, and has a maximum-height tooth. The brush-seal region is radially positioned near the tips of the blades and is longitudinally positioned toward the longitudinally downstream side of the blades. The fluid expansion chamber has a radial dimension greater than the height of the maximum-height tooth. As viewed in a cross section of the rotary machine taken by a cutting plane wherein the longitudinal axis lies in the cutting plane, the brush seal region defines a longitudinal downstream boundary of the fluid expansion chamber, the tooth-seal region defines a longitudinal upstream boundary of the fluid expansion chamber, the tips of the buckets define a radially-inner boundary of the fluid expansion chamber, and the stator, longitudinally between the brush-seal region and the tooth-seal region, defines a radially-outer boundary of the fluid expansion chamber.

Several benefits and advantages are derived from the invention. The fluid expansion chamber slows down the fluid (e.g., steam or gas) flow so that the hard-water solid particles in steam turbines and the foreign object particles in gas turbines are slower moving, and hence cause less damage, when they impact the brush-seal region.

DETAILED DESCRIPTION OF THE INVENTION

Figure 1:
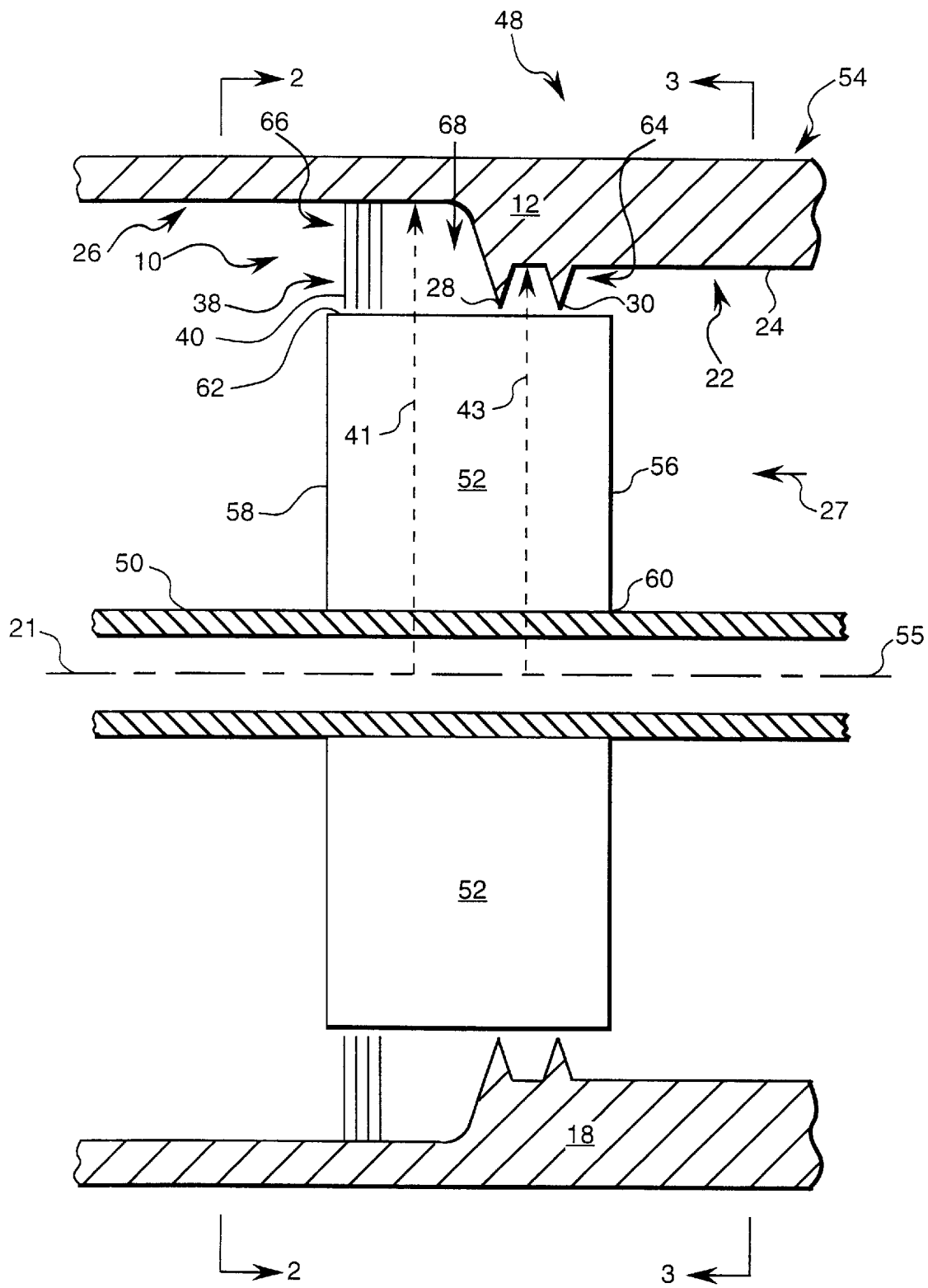
FIG. 1 is a schematic, longitudinal cross-sectional view of an embodiment of the present invention.
Figure 2:
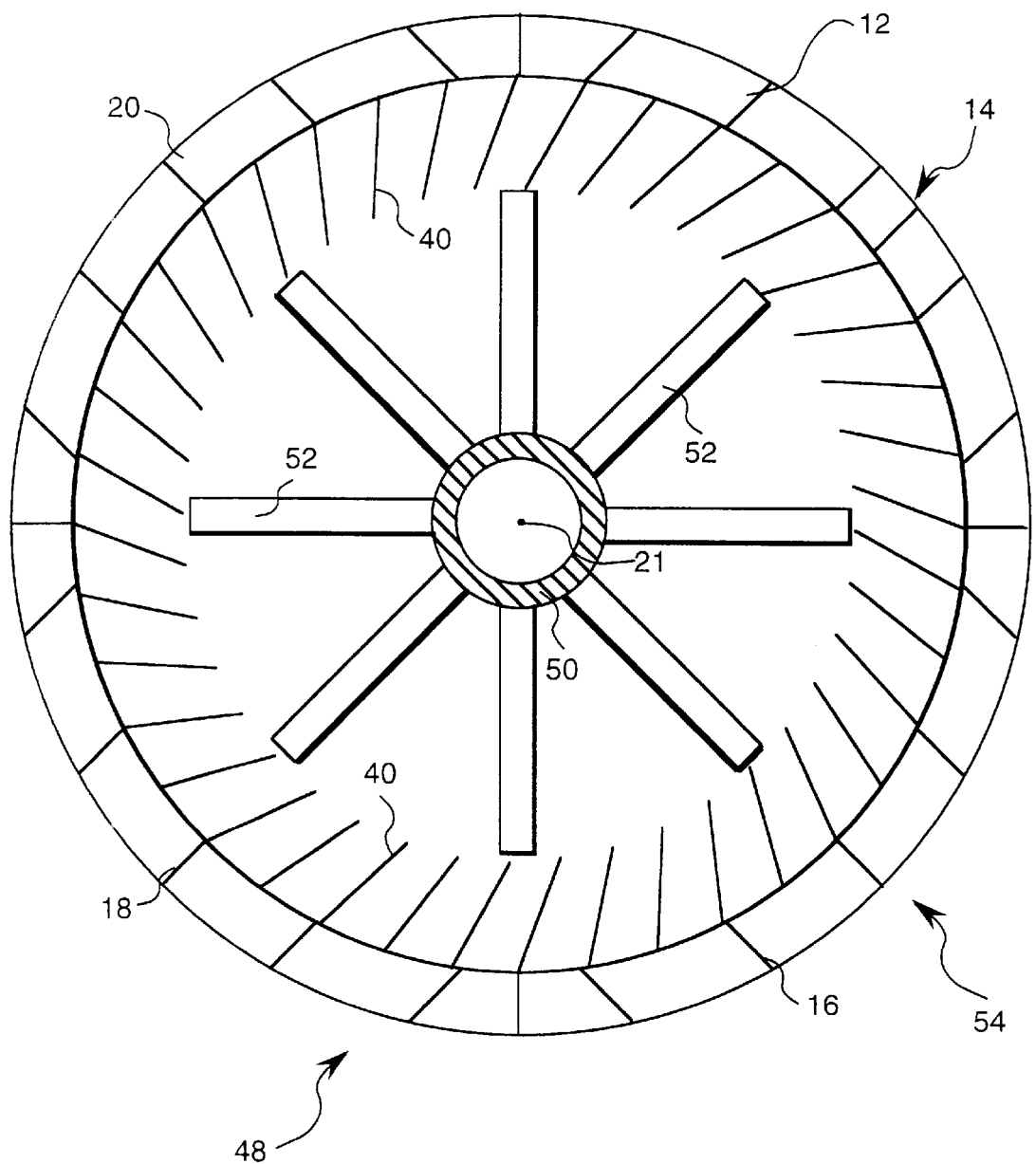
FIG. 2 is a cross-sectional view taken along lines 2—2 of FIG. 1.
Figure 3:
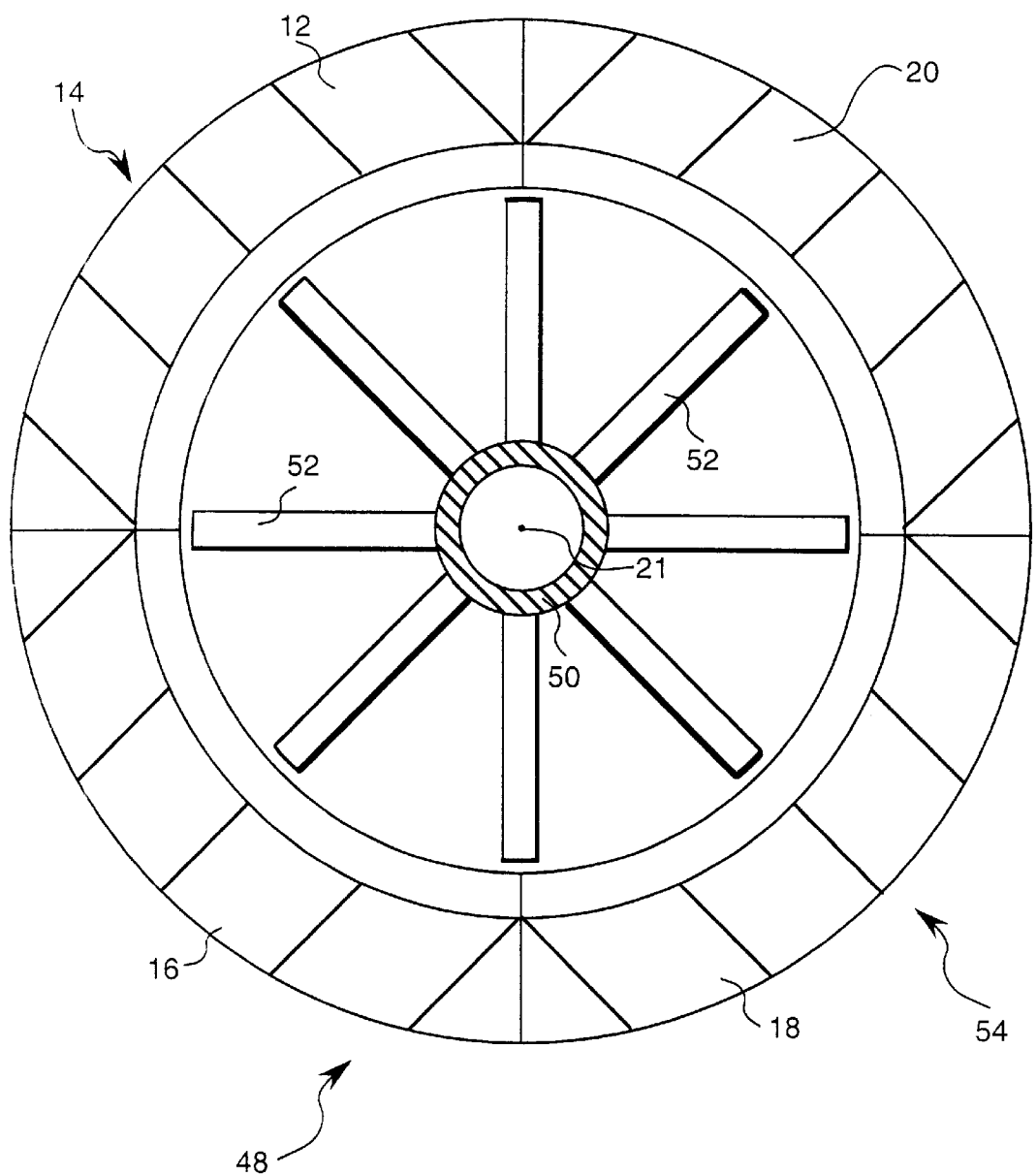
FIG. 3 is a cross-sectional view taken along lines 3—3 of FIG. 1.

Referring now to the drawings, FIGS. 1–4 schematically show an embodiment of the present invention. In a first expression of the invention, a seal assembly 10 includes an arcuate member 12. In this embodiment, as shown in FIGS. 2 and 3, an annular seal 14 also contains three additional members 16, 18, and 20 each generally identical to arcuate member 12. The number of arcuate members, which can range from one on up, is determined by manufacture and assembly considerations, as can be appreciated by the artisan. Referring to FIG. 1, the arcuate member 12 has a longitudinal axis 21 and a radially inward side 22 facing the longitudinal axis 21. The radially inward side 22 includes a longitudinal upstream portion 24 and a longitudinal downstream portion 26. In operation, the arcuate member 12 is disposed such that the main flow of fluid is in a direction 27 from the longitudinal upstream portion 24 to the longitudinal downstream portion 26.

The longitudinal upstream portion 24 of the radial inward side 22 includes a plurality of longitudinally spaced-apart, circumferentially extending, and radially-inward-protruding seal teeth. Only two teeth 28 and 30 are shown in schematic FIG. 1 while five teeth 28, 30, 32, 34, and 36 are shown in more detailed FIG. 4. The number of teeth is chosen by the artisan based on the particular level of sealing required and on space constraints.

Figure 4:
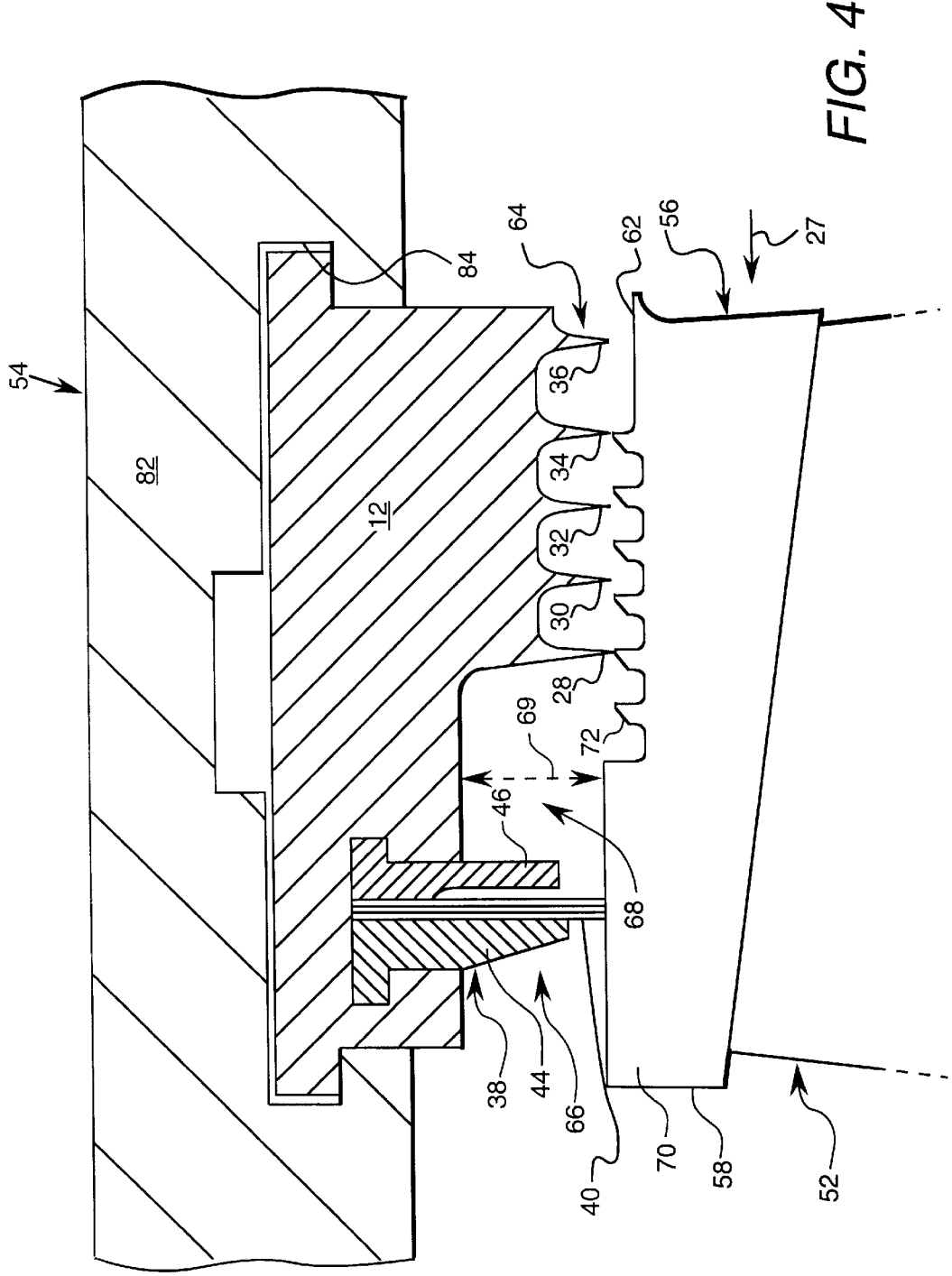
FIG. 4 is a more detailed view of a portion of FIG. 1.

The longitudinal downstream portion 26 of the radial inward side 22 includes a circumferentially extending brush seal 38 having a multiplicity of bristles 40. The brush seal 38 is longitudinally spaced apart from the seal teeth 28–36. As seen in FIGS. 1 and 4, the bristles 40 protrude radially inward when viewed in a cross section of the arcuate member 12 taken by a cutting plane wherein the longitudinal axis 21 lies in the cutting plane.

The radially inward side 22 has a radius (i.e., a line extending perpendicularly from the longitudinal axis 21 to the radially inward side 22) which varies longitudinally such that the radius is larger, longitudinally between the brush seal 38 and a longitudinally-closest one 28 of the seal teeth to the brush seal 38, than longitudinally between the seal teeth of a longitudinally-closest pair 28 and 30 of the seal teeth to the brush seal 38. The larger radius, found longitudinally between the brush seal 38 and seal tooth 28, is identified as dashed line 41 in FIG. 1. The smaller radius, found longitudinally between seal teeth 28 and 30, is identified as dashed line 43 in FIG. 1.

The seal teeth 28–36 may be monolithic with the rest of the arcuate member 12 as suggested by schematic FIG. 1 or may be separate from and attached to the arcuate member 12 as shown in more detailed FIG. 4. The bristles 40 may be attached directly to the arcuate member 12 as suggested by schematic FIG. 1 or may be held between a brush-seal backing plate 44 and a brush-seal front plate 46 as shown in more detailed FIG. 4. In FIG. 4, the arcuate member 12 is a steam-turbine spill strip having monolithically-formed seal teeth 28–32 and holding brush seal 38.

In this example, it is noted that the radius of the radially inward side 22 is larger, longitudinally between the brush seal 38 and the longitudinally-closest one 28 of the seal teeth to the brush seal 38, than longitudinally between any longitudinally-adjacent seal teeth 28 & 30, 30 & 32, 32 & 34, and 34 & 36. Here, the arcuate member 12 is devoid of any other brush seal longitudinally upstream from the seal teeth 28–36. Likewise, the arcuate member 12 is devoid of any other seal teeth longitudinally downstream from the brush seal 38. The brush seal 38 functions as the primary seal, and the seal teeth 28–36 function as the secondary seal. All of the seal teeth 28–36 are positioned longitudinally upstream from the brush seal 38 so that they will break down into smaller particles any debris in the fluid stream before such debris reaches the brush seal 38. The larger radius 41 creates an expansion volume which slows down the fluid stream, as can be appreciated by the artisan, so the smaller particles will inflict only minimal wear when impacting the bristles 40.

In one construction, the arcuate member 12 comprises or consists essentially of stainless steel. Here, as seen in FIGS. 1 and 4, the seal teeth 28–36 are a monolithic portion of the arcuate member 12. The bristles 40 comprise or consist essentially of a cobalt or nickel super alloy.

In a second expression of the invention, and again referring to FIG. 4, a rotary machine 48 includes a rotor 50, a row of blades 52, and a stator 54. Examples of rotary machines include, without limitation, steam and gas turbines. The term "rotor" includes, without limitation, a rotor shaft, a disk, and the like. The term "blade" includes, without limitation, gas turbine blades, steam turbine buckets, and the like, and refers, without limitation, to a blade with or without a separate or monolithic shroud at the blade tip, a bucket with or without a separate or monolithic bucket cover at the bucket tip, and the like. The terms "blade" and "rotor" include a separate blade and a separate rotor as well as a blade portion and a rotor portion of a monolithic blisk (i.e., a monolithic blade-disk).

Referring to FIG. 1, the rotor 50 has a longitudinal axis 55 which is coincident with the previously-described longitudinal axis 21. Each blade 52 has a longitudinally upstream edge 56 (i.e., a leading edge), a longitudinally downstream edge 58 (i.e., a trailing edge), a root 60 attached to the rotor 50, and a radially-outward-extending tip 62. The main flow of fluid is in a direction 27 alternatively described as a direction from the longitudinally upstream edge 56 to the longitudinally downstream edge 58. The stator 54 is generally coaxially aligned with the longitudinal axis 55 and circumferentially surrounds the row of blades 52. The stator 54 includes a tooth-seal region 64, a brush-seal region 66, and a fluid expansion chamber 68.

The tooth-seal region 64 is radially disposed proximate the tips 62 of the blades 52 and is longitudinally disposed toward (and in one example proximate) the longitudinally upstream edge 56 of the blades 52. The tooth-seal region 64 has a maximum-height tooth. In this example, the tooth-seal region 64 is defined by the previously-described seal teeth 28–36. From FIG. 4, it is noted that, in this example, all of the seal teeth 28–36 have generally the same height, so any of the seal teeth 28–36 is a maximum-height tooth, such as tooth 28.

The brush-seal region 66 is radially disposed proximate the tips 62 of the blades 52 and is longitudinally disposed toward (and in one example proximate) the longitudinally downstream edge 58 of the blades 52. In this example, the brush-seal region 66 is defined by the previously-described brush seal 38. As previously described, the brush seal 38 includes bristles 40, a backing plate 44, and a front plate 46.

The fluid expansion chamber 68 extends a radial distance 69 which is greater than the height of the maximum-height tooth (e.g., tooth 28). Consider a cross section of the rotary machine 48 as seen in FIGS. 1 and 4. Such cross section is taken by a cutting plane wherein the longitudinal axis 55 lies in the cutting plane. When viewed in such cross section, the fluid expansion chamber 68 has boundaries defined as follows. The brush seal region 66 defines a longitudinal downstream boundary of the fluid expansion chamber 68, and the tooth-seal region 64 defines a longitudinal upstream boundary of the fluid expansion chamber 68. The tips 62 of the blades 52 define a radially-inner boundary of the fluid expansion chamber 68, and the stator 54, longitudinally between the brush-seal region 66 and the tooth-seal region 64, defines a radially-outer boundary of the fluid expansion chamber 68. In an example, the fluid expansion chamber 68 has at least generally twice the longitudinal and radial extent as does the void volume between any two adjacent seal teeth 28–36. Here, the speed of any particles in the fluid flow striking the bristles 40 will be generally at least four times less than the speed of any debris in the fluid flow striking the seal teeth 28–36, and the impact energy of a mass striking the bristles 40 will be generally at least sixteen times less than the impact energy of the same mass striking the seal teeth 28–36.

Figure 5:
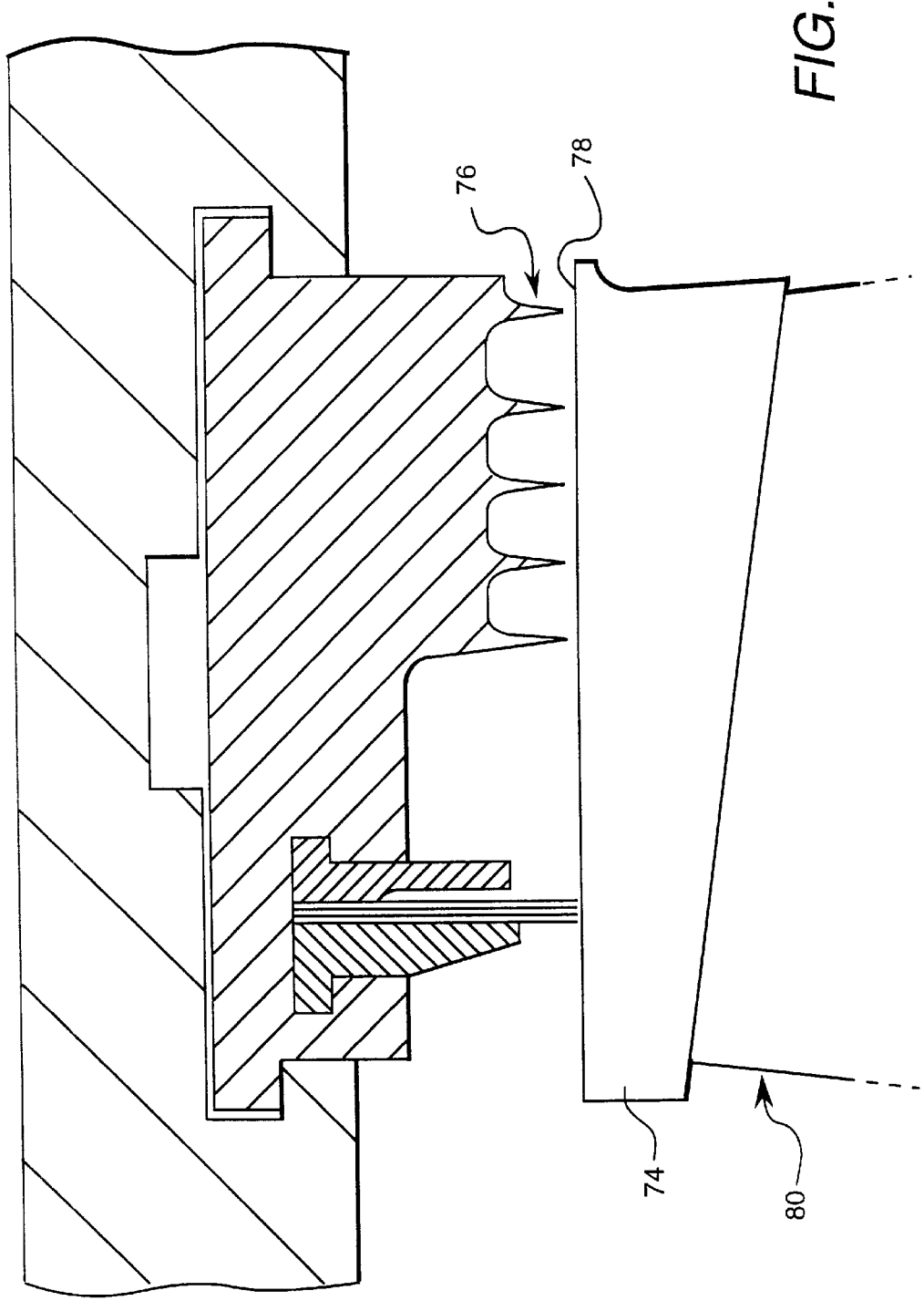
FIG. 5 is a view, as in FIG. 4, of another embodiment of the present invention.

In FIG. 4, the blades 52 have blade-tip shrouds 70 (also known as bucket covers) which include teeth 72. In this example, the tooth-seal region 64 and the tips 62 of the blades 52 proximate the tooth-seal region 64 together define a vernier seal. In one construction, three stator knife edge pitches radially oppose four rotor knife edge pitches where tooth 36 is gapped normal and where teeth 28–34 are set to have two-thirds of the radial gap (i.e., radial clearance) of tooth 36. In another embodiment, as seen in FIG. 5, the blade-tip shrouds 74 lack teeth, and the tooth-seal region 76 and the tips 78 of the blades 80 proximate the tooth-seal region 76 define a labyrinth seal.

In an example shown in FIG. 4, the stator 54, longitudinally between the longitudinally upstream and downstream edges 56 and 58 of the blades 52, is devoid of any other brush-seal region longitudinally upstream from the tooth-seal region 64. Likewise, the stator 54, longitudinally between the longitudinally upstream and downstream edges 56 and 58 of the blades 52, is devoid of any other tooth-seal region longitudinally downstream from the brush-seal region 66. Here, the stator 54 includes a stator casing 82 and the arcuate member 12, wherein the arcuate member 12 is disposed in a groove 84 of the stator casing 82 and includes the tooth-seal region 64, the brush-seal region 66, and the fluid expansion chamber 68. It is noted that in rotary machines having two or more rows of blades, the stator may include an additional pair of brush-seal and tooth-seal regions for any of the additional rows of blades.

In operation, the rotary machine 48 has its rotor 50 rotate the blades 52 about the longitudinal axis 55. The efficiency of the rotary machine 48 requires a minimum of fluid path leakage between the tips 62 of the blades 52 and the circumferentially surrounding stator 54. The brush-seal region 66 of the stator 54 provides a primary seal for that purpose. As a secondary backup seal, the stator 54 also includes a tooth-seal region 64 which provides less sealing capability than a brush seal but which provides better wear against impact damage from debris in the fluid path of the rotary machine 48. As previously mentioned, such debris includes, among other things, hard-water deposits in steam turbines and runway pebbles in aircraft gas turbines. Such debris is concentrated at the radially outer zone of the fluid path due to centrifugal force, such radially outer zone including the gap between the tips 62 of the blades 52 and the circumferentially surrounding stator 54. The longitudinally-upstream location of the tooth-seal region 64 has the seal teeth 28–36 break down the debris into smaller dust-like particles. The fluid expansion chamber 68 of the stator 54, which is located longitudinally downstream from the tooth-seal region 64, slows down the particles so they strike the brush-seal region 66 with minimal impact and damage to the bristles 40.

If necessary, the brush-seal region 66 may contain one or more small areas devoid of bristles to allow easier passage of the particles. For example, and in order to minimize bias leakage between circumferential segments 12 and 16–20, but still provide for easy assembly, the segment ends at the turbine horizontal joint may be cut in a purely radial direction while all other segment ends are cut at an angle, such as forty-five degrees, consistent with the bristle cant angle. This means, in one steam turbine example, that a small section of bristles is lost at the horizontal joint (allowing for easier passage of the particles), and it ensures that the upper and lower stator casing halves can be assembled without hanging up while still providing a continuous bristle pack around nearly the entire circumference of the seal.

The foregoing description of several expressions and embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A seal assembly comprising an arcuate member having a longitudinal axis and a radially inward side facing said longitudinal axis, wherein said radial inward side includes a longitudinal upstream portion and a longitudinal downstream portion, wherein said longitudinal upstream portion includes a plurality of longitudinally spaced-apart, circumferentially extending, and radially-inward-protruding seal teeth, wherein said longitudinal downstream portion includes a circumferentially extending brush seal having a multiplicity of bristles, said brush seal longitudinally spaced apart from said seal teeth, and said bristles protruding radially inward when viewed in a cross section of said arcuate member taken by a cutting plane wherein said longitudinal axis lies in said cutting plane, and wherein said radially inward side has a radius which varies longitudinally such that said radius is larger, longitudinally between said brush seal and a longitudinally-closest one of said seal teeth to said brush seal, than longitudinally between said seal teeth of a longitudinally-closest pair of said seal teeth to said brush seal.

2. The seal assembly of claim 1, wherein said arcuate member is a steam-turbine spill strip.

3. The seal assembly of claim 1, wherein said radius is larger, longitudinally between said brush seal and said longitudinally-closest one of said seal teeth to said brush seal, than longitudinally between any longitudinally-adjacent seal teeth.

4. The seal assembly of claim 1, wherein said arcuate member is devoid of any other brush seal longitudinally upstream from said seal teeth.

5. The seal assembly of claim 1 wherein said arcuate member is devoid of any other seal teeth longitudinally downstream from said brush seal.

6. The seal assembly of claim 5, wherein said arcuate member is devoid of any other brush seal longitudinally upstream from said seal teeth.

7. The seal assembly of claim 6, wherein said radius is larger, longitudinally between said brush seal and said longitudinally-closest one of said seal teeth to said brush seal, than longitudinally between any longitudinally-adjacent seal teeth.

8. The seal assembly of claim 7, wherein said arcuate member is a steam-turbine spill strip.

9. A rotary machine comprising:
  a) a rotor having a longitudinal axis;
  b) a row of blades each having a longitudinally upstream edge, a longitudinally downstream edge, a root attached to said rotor, and a radially-outward-extending tip;
  c) a stator generally coaxially aligned with said longitudinal axis and circumferentially surrounding said row of blades, said stator including:
    (1) a tooth-seal region radially disposed proximate said tips of said blades and longitudinally disposed toward said longitudinally upstream edge of said blades, said tooth-seal region having a maximum-height tooth;
    (2) a brush-seal region radially disposed proximate said tips of said blades and longitudinally disposed toward said longitudinally downstream side of said blades; and
    (3) a fluid expansion chamber extending a radial distance which is greater than the height of said maximum-height tooth, wherein, as viewed in a cross section of said rotary machine taken by a cutting plane wherein said longitudinal axis lies in said cutting plane, said brush seal region defines a longitudinal downstream boundary of said fluid expansion chamber, said tooth-seal region defines a longitudinal upstream boundary of said fluid expansion chamber, said tips of said blades define a radially-inner boundary of said fluid expansion chamber, and said stator, longitudinally between said brush-seal region and said tooth-seal region, defines a radially-outer boundary of said fluid expansion chamber.

10. The rotary machine of claim 9, wherein said tooth-seal region and said tips of said blades proximate said tooth-seal region together define a vernier seal.

11. The rotary machine of claim 9, wherein said tooth-seal region and said tips of said blades proximate said tooth-seal region together define a labyrinth seal.

12. The rotary machine of claim 9, wherein said stator, longitudinally between said longitudinally upstream and downstream edges of said blades, is devoid of any other brush-seal region longitudinally upstream from said tooth-seal region.

13. The rotary machine of claim 9, wherein said stator, longitudinally between said longitudinally upstream and downstream edges of said blades, is devoid of any other tooth-seal region longitudinally downstream from said brush-seal region.

14. The rotary machine of claim 13, wherein said stator, longitudinally between said longitudinally upstream and downstream edges of said blades, is devoid of any other brush-seal region longitudinally upstream from said tooth-seal region.

15. The rotary machine of claim 14, wherein said tooth-seal region and said tips of said blades proximate said tooth-seal region together define a labyrinth seal.

16. The rotary machine of claim 14, wherein said tooth-seal region and said tips of said blades proximate said tooth-seal region together define a vernier seal.

* * * * *